United States Patent [19]

Battye et al.

[11] 4,030,904

[45] June 21, 1977

[54] SURFACE COATING OF GLASS CONTAINERS WHILE ANNEALING

[75] Inventors: Christopher John Battye, St. Albans; Roger John Dorey, Harpenden, both of England

[73] Assignee: United Glass, Ltd., Staines, England

[22] Filed: Aug. 8, 1975

[21] Appl. No.: 603,014

Related U.S. Application Data

[63] Continuation-in-part of Ser. No. 503,786, Sept. 6, 1974, abandoned.

[30] Foreign Application Priority Data

Sept. 10, 1973 United Kingdom ............ 42473/73

[52] U.S. Cl. ............................... 65/60 A; 65/60 B; 427/226; 427/255; 427/387
[51] Int. Cl.² ......................................... C03C 17/28
[58] Field of Search ............ 65/24, 26, 60 A, 60 B, 427/226, 255, 419, 407, 387

[56] References Cited

UNITED STATES PATENTS

| | | | |
|---|---|---|---|
| 3,667,926 | 6/1972 | Green et al. ......................... | 65/26 X |
| 3,811,921 | 5/1974 | Crawford et al. .................... | 65/60 X |
| 3,928,673 | 12/1975 | Pardee et al. ...................... | 65/26 X |

*Primary Examiner*—Arthur D. Kellogg
*Attorney, Agent, or Firm*—Cushman, Darby & Cushman

[57] ABSTRACT

Abrasion resistant glass containers are manufactured by a process in which, after forming but before annealing, the containers are treated with a material which forms a metal oxide surface coating and with a solution, suspension or emulsion of a temperature resistant polymeric material.

17 Claims, No Drawings

SURFACE COATING OF GLASS CONTAINERS WHILE ANNEALING

RELATED APPLICATION

This application is a continuation-in-part of our application Ser. No. 503,786, filed Sept. 6th 1974 and now abandoned.

This invention relates to a method for the surface treatment of glass containers so as to provide glass containers which are substantially more resistant to abrasion than containers not so treated.

It is well known that glass containers can be given a substantial resistance to abrasion by applying a metal oxide coating to the surface while the glass is at a temperature of several hundred degrees Centigrade, and then subsequently applying a lubricant to the glass surface, while the temperature of the glass is in the region of 100°–200° C. In practice, the first of these treatments is applied soon after the glass containers are formed, and before they enter the annealing lehr, and a number of methods are established for carrying out this treatment involving contact of the glass surface with metal halides in vapour form, metal organic compounds in vapor form, and metal organic compounds in liquid form (see, for example, our U.K. patent specifications Nos. 1,024,468; 1,115,342; 1187783; 1,187,784; 1,257,647 and 1,312,121).

The second treatment is normally carried out when the glass containers are emerging from the annealing lehr, and since at this stage the containers are generally arranged in rows on a wide belt it is common to use a liquid spray material applied from a reciprocating spray station. The material applied in this case may for example be a polyethylene glycol or an emulsion of polyethylene. Alternatively, the containers may be treated with the vapor of a fatty acid by passing them through a hood wherein such a vapour circulates. Several materials have been found suitable for the treatment of glass with organic lubricant and a wide range of materials are available for this purpose.

However, in all of the methods so far known it is necessary, in order to achieve the desired abrasion resistance of the surface of the glass containers, to apply two separate treatments as indicated, one prior to annealing and one after annealing. Different types of treatment machinery are required for each of the two treatments, and from a practical point of view this may involve additional trouble and expense in installation and maintenance of the two sets of equipment, as well as additional expenditure in the inspection of the equipment at each operating location. Furthermore, in the manner in which the second treatment is normally carried out it is not always possible to treat all parts of the surface and all surfaces of the containers uniformly, and it also may become difficult to avoid migration of the spray material into the interiors of the containers.

It is an object of the present invention to provide a method of treatment of glass containers such that the treated containers possess adequate abrasion resistance, wherein the treatment is carried out wholly before the glass containers are annealed and under conditions such that the treatment is effectively applied to those areas on the external surface which require treatment, while for all practical purposes, the interior surface is not treated at all.

This novel treatment is effected, according to the invention, by applying the normal metal oxide treatment and at the same time, and even in the same treatment hood, applying by spray application on solution, emulsion or suspension of a temperature resistant polymeric material. The term "temperature resistant polymeric material" as used herein means a material which may be wholly or partly organic in character and is substantially resistant to oxidation or thermal degradation when maintained at a temperature of up to 550° C for a period of several minutes.

The metal oxide treatment may be inter alia any of those treatments described in our U.K. patent specifications listed above. Thus, for example, it may comprise spraying the hot containers with a high decomposition point organic titanium compound such as those described in U.K. patent specification No. 1,024,468; or spraying the containers with a solution or dispersion of a tin compound in an organic liquid, such as is described in U.K. patent specificaion No. 1,115,342; or spraying the containers with a complex compound of titanium or tin, such as is described in U.S. patent specification Nos. 1,187,783 and 1,187,784; or spraying the containers with a plurality of reagents, such as is described in U.K. patent specification Nos. 1,257,647 and 1,312,121. Many other methods and reagents are known for treating hot glass containers in order to provide on their surfaces abrasion-resistant metal oxide coatings, and these may all come into consideration as the metal oxide treatment herein.

In those cases where the metal oxide treatment is effected by contacting the hot glass containers with the vapour of a metal compound, the solution, emulsion or suspension of the temperature resistant polymeric material is applied to the containers in the same hood or chamber as used to apply the metal compound, but independently thereof. Alternatively, when the metal oxide treatment is effected by applying a liquid compound in spray form, it may be advantageous to incorporate the temperature resistant polymeric material as a solution, emulsion or suspension in the liquid metal-containing material so that both treatments are effected in one single spray application. In all cases the quantity of the temperature resistant polymeric material applied and its position of application can effectively be controlled by flow rate of the solution, emulsion or suspension sprayed, by the number and position of the sprays used, and by the angles at which the sprays are directed at the glass containers. By ensuring that the sprays are directed away from the neck of the container, for example, contamination of the internal surface can be minimised.

Suitable temperature resistant polymeric materials for use in the invention include polyphenylene sulphide, polyphenylene oxide, polyimides, polyimide-amides, polybenzoxazole, and a variety of related compounds, including polyphenylquinoxalines, polybenzimidazoles, poly-bis-benzimidazo-benzophenanthroline, polyimidazopyrroles, Diels-Alder polyphenylenes, polybenzothiazoles, poly(alkyl-aryl ethers), carborane-siloxanes, cyclodisilazanes and poly(p-oxybenzoyl) (sold by the Carborundum Co. under the name "Ekonol"). For application to glass containers in accordance with this invention it is highly desirable that the material be prepared in a finely divided state and then dissolved, emulsified or suspended in a suitable solvent, perferably water. Preferably the polymeric material has a particle size not greater than 100 $\mu$m, and preferably it is substantially less than 50 $\mu$m. The finished material ready for use should preferably contain 10–20% by weight of polymer, but greater or lesser concentrations may also be used. The temperature resistant polymeric material may be applied to the glass containers while the latter are at a temperature greater than 450° C, or alternatively it may be advantageous to cool the containers rapidly to a surface temperature below 450° C, apply the polymer and then allow the containers to be heated to a temperature above 550° C in order to anneal.

The following Examples are given for the purpose of illustrating the invention.

EXAMPLE 1

Glass bottles, immediately after forming, were treated with a solution prepared by reacting tin tetrachloride and n-butyl acetate, the final solution containing 10% tin (w/v). The liquid was applied to the bottles through two sprays, one on either side of a treatment tunnel straddling the conveyor carrying the bottles from the forming machine to an annealing lehr. The throughput of each spray was 3.0 mls. per minute.

While in the treatment tunnel the containers were also subjected to the application of an aqueous suspension of polyphenylene sulphide, this suspension being prepared by diluting a commercially obtainable Ryton suspension with deionised water such that the final material contained 15% by weight finely divided solids. The suspension was applied through four spray guns (Binks-Bullows L540), each supplied by a metering pump operating at 2 ml/minute. Atomising air at 40 psi was used.

After treatment in the tunnel the bottles were annealed in the normal way in an annealing lehr, and then examined for the presence of lubricity and organic material on the surface, in comparison with bottles which had received the tin treatment but not the Ryton treatment. It was found that the Ryton-treated bottles possessed greater lubricity than the bottles not so treated, and contact angle measurements with aqueous solutions indicated the presence of an organic material on the surface of the annealed bottles, this material not being present on the bottles not given the Ryton treatment.

EXAMPLE 2

This was carried out in similar fashion to Example 1, except that the organic material was a 15% solids aqueous suspension of Keramid 601 polyimide (supplied by May and Baker Ltd.). It was found that the bottles treated with polyimide resin showed, after annealing, evidence of lubricity and presence of organic material on the surface.

EXAMPLE 3

This was also carried out in similar fashion to Example 1, except that the organic material used was a 15% aqueous suspension of Amoco All polyimide-amide. It was found that the bottles treated with the polyimide-amide resin showed, after annealing, evidence of lubricity and presence of organic material on the surface.

EXAMPLE 4

This was again carried out in similar fashion to Example 1, except that the organic material used was polybenzoxazole (as supplied by Yorkshire Chemicals Ltd. under their trade name PB03) and this was applied as a 7.5% solution in N-methyl pyrrolidine. It was found that the bottles which had received the PB03 treatment showed, after annealing, evidence of lubricity and presence of organic material on the surface.

EXAMPLE 5

This was also carried out in similar fashion to Example 1, except that the tin treatment comprised reaction of the glass containers with the vapour of tin tetrachloride, which was produced by bubbling dry air through liquid tin tetrachloride and passing the saturated vapour into the treatment tunnel such that the bottles were exposed to the vapour of the tin tetrachloride. It was found that the bottles which had been treated with the tin tetrachloride vapour followed by the Ryton suspension showed greater lubricity than bottles given the tin tetrachloride treatment only.

EXAMPLE 6

A suspension of finely divided polyphenylene sulphide was prepared in n-butyl acetate such that the polymer constituted 10% by weight of the mix. This suspension was applied through a standard spray head, at a flow rate of 10–20 ml/min, into glass containers which had just been formed and were at a temperature of 500° C, simultaneously with application to the containers of a liquid tin organic material, prepared as described in Example 1. After treatment the containers were annealed in the normal way, and after annealing it was found that the containers possessed substantial resistance to abrasion, whereas glass containers without any treatment, or glass containers with the metal oxide treatment only, had relatively poor resistance to abrasion.

What we claim is:

1. A method of treating glass containers wherein the containers, after forming and before annealing, are subjected to the action of a material which forms a metal oxide coating on the surface thereof and to the spray application of a spray reagent comprising a solution, emulsion or suspension of a polymeric material resistant to oxidation and thermal degradation when maintained at a temperature of 550° C for a period of several minutues, said polymeric material being polyphenylene sulfide, polyphenylene oxide, a polyimide, a polyimide-amide or polybenzoxazole, a polyphenylquinoxaline, a polybenzamidazole, poly-bis-benzimidazo-benzophenanthroline, a polyimidazopyrrole, a Diels-Alder polyphenylene, a polybenzothiazole, a poly(alkyl-aryl ether), a carborane-siloxane, a cyclodisilazane or poly(p-oxybenzoyl), whereafter the containers are annealed.

2. A method as claimed in claim 1 wherein the polymeric material is polyphenylene sulphide, polyphenylene oxide, a polyimide, a polyimide-amide or polybenzoxazole.

3. A method as claimed in claim 1 wherein the polymeric material is a polyphenylquinoxaline, a polybenzamidazole, poly-bis-benzimidazo-benzophenanthroline, a polyimidazopyrrole, a Diels-Alder polyphenylene, a polybenzothiazole, a poly(alkyl-aryl ether), a carborane-siloxane, a cyclodisilazane or poly(p-oxybenzoyl).

4. A method as claimed in claim 1 wherein the solution, emulsion or suspension is an aqueous one.

5. A method as claimed in claim 1 wherein the polymeric material, before solution, emulsifying or suspending, is in a finely divided state.

6. A method as claimed in claim 1 wherein the polymeric material has a particle size less than 100 $\mu$m.

7. A method as claimed in claim 1 wherein the solution, emulsion or suspension of polymeric material contains from 10% to 20%, by weight, of polymeric material.

8. A method as claimed in claim 1 wherein the metal oxide-forming material and the solution, emulsion or suspension of polymeric material are mixed and sprayed onto the containers through the same spray.

9. A method according to claim 6, wherein the polymeric material has a particle size of less than 50 m.

10. A method according to claim 1 wherein the polymeric material is polyphenylene sulfide.

11. A method according to claim 1, wherein the polymeric material is polyphenylene oxide.

12. A method according to claim 1, wherein the polymeric material is a polyimide.

13. A method according to claim 1, wherein the polymeric material is a polyimide-amide.

14. A method according to claim 1, wherein the polymeric material is polybenzoxazole.

15. An annealed glass container prepared by the method of claim 1.

16. An annealed glass container according to claim 15, wherein the polymeric material is polyphenylene sulfide, polyphenylene oxide, a polyimide, a polyimide-amide or polybenzoxazole.

17. An annealed glass container according to claim 15, wherein the polymeric material is a polyphenylquinoxaline, a polybenzamidazole, poly-bis-benzimidazo-benzophenanthroline, a polyimidazopyrrole, a Diels-Alder polyphenylene, a polybenzothiazole, a poly(alkyl-aryl ether), a carborane-siloxane, a cyclodisilazane or poly(p-oxybenzoyl).

* * * * *